US006267251B1

(12) United States Patent
Sullivan

(10) Patent No.: US 6,267,251 B1
(45) **Date of Patent: *Jul. 31, 2001**

(54) FILTER ASSEMBLY FOR A PRINT CARTRIDGE CONTAINER FOR REMOVING CONTAMINANTS FROM A FLUID

(75) Inventor: Carl Edmond Sullivan, Versailles, KY (US)

(73) Assignee: Lexmark International, Inc., Lexington, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,431

(22) Filed: Dec. 18, 1997

(51) Int. Cl.[7] .......................... B01D 29/05; B01D 29/58

(52) U.S. Cl. .......................... 210/488; 210/459; 210/460; 210/489; 210/490; 347/92; 347/93

(58) Field of Search .......................... 210/488, 489–490, 210/459–460; 216/41, 47, 49, 51, 43, 56, 79; 347/92, 93

(56) References Cited

U.S. PATENT DOCUMENTS 4,095,237 * 6/1978 Amberntsson et al. .
4,561,789 * 12/1985 Saito .
4,639,748 * 1/1987 Drake et al. .
4,771,295 * 9/1988 Baker et al. .
4,864,329 9/1989 Kneezel et al. .......................... 347/93
4,931,811 * 6/1990 Cowger et al. .
5,124,717 6/1992 Campanelli et al. .................. 347/93
5,141,596 8/1992 Hawkins et al. ....................... 347/93
5,154,815 * 10/1992 O'Neill .
5,201,987 4/1993 Hawkins et al. ..................... 156/633
5,204,690 4/1993 Lorenze, Jr. et al. ................. 347/93
5,308,442 5/1994 Taub et al. .
5,443,713 8/1995 Hindman ................................ 205/70
5,537,136 7/1996 Brandon et al. ....................... 347/87

(List continued on next page.)

FOREIGN PATENT DOCUMENTS 0 518 467 12/1992 (EP) .
0 657 291A 6/1995 (EP) .
WO 95 13860 5/1995 (WO) .

OTHER PUBLICATIONS

Lewis, Richard J., Sr., Hawley's Condensed Chemical Dictionary, 13th ed.; pp. 40–41 & 1072, 1997.*

Cees Van Rijn, et al., "Deflection and Maximum Load of Microfiltration Membrane Sieves Made with Silicon Micromachining".

Journal of Microelectromechanical Systems, vol. 6, No. 1, Mar., 1997, pp. 48–54.

Hawley's Condensed Chemical Dictionary, 13th ed (Lewis, Richard, John Wiley & Sons, pp. 231).*

Schnakenberg et al. "THAHW Etchants for Silicon Micromachining", Jun. 1991, In Proc. Int. Conf. on Solid State Sensors and Actuators (Transducers 1991), pp. 815–818.*

*Primary Examiner*—W. L. Walker
*Assistant Examiner*—Marianne Ocampo
(74) *Attorney, Agent, or Firm*—John A. Brady

(57) ABSTRACT

A filter is provided for filtering contaminants from a fluid passing through the filter. The filter comprises a silicon substrate having opposing first and second surfaces and a passage extending through it. A first etch resistant material layer is formed on the first substrate surface and includes at least one opening which extends through the first layer and communicates with the substrate passage. A second etch resistant material layer is formed on the second substrate surface and includes a plurality of pores which extend through the second layer and communicate with the substrate passage. The second layer defines a filter layer which filters contaminants from fluid passing through the second layer. A process for forming the filter is also provided.

12 Claims, 5 Drawing Sheets

U.S. PATENT DOCUMENTS

| | | | | |
|---|---|---|---|---|
| 5,560,837 | | 10/1996 | Trueba | 347/93 |
| 5,576,750 | | 11/1996 | Brandon et al. | 347/87 |
| 5,610,645 | * | 3/1997 | Moore et al. | 347/93 |
| 5,658,471 | * | 8/1997 | Murthy et al. | 347/65 |
| 6,048,051 | * | 4/2000 | Ahn . | |

* cited by examiner

FILTER ASSEMBLY FOR A PRINT CARTRIDGE CONTAINER FOR REMOVING CONTAMINANTS FROM A FLUID

CROSS-REFERENCE TO RELATED APPLICATION

This application is related to contemporaneously filed U.S. patent application Ser. No. 08/993,535 entitled "A Filter Formed as Part of a Heater Chip For Removing Contaminants From a Fluid and a Method For Forming Same," by Carl E. Sullivan, filed Dec. 18, 1997 still pending, the disclosure of which is incorporated herein by reference.

FIELD OF THE INVENTION

This invention relates to a filter for removing contaminants from a fluid and a process for forming same and, more particularly, to a filter adapted for use in an ink jet print cartridge for filtering contaminants from ink prior to the ink flowing to a heater chip.

BACKGROUND OF THE INVENTION

Drop-on-demand ink jet printers use thermal energy to produce a vapor bubble in an ink-filled chamber to expel an ink droplet. A thermal energy generator or heating element, usually a resistor, is located in the chamber on a heater chip near a discharge orifice or nozzle. A plurality of chambers, each provided with a single heating element, are provided in the printer's printhead. The printhead typically comprises the heater chip and a plate having a plurality of the discharge orifices formed therein. The printhead forms part of an ink jet print cartridge which also comprises an ink-filled container.

The print cartridge container includes one or more ink chambers. For a monochrome or single color print cartridge, one chamber is provided. For a three color print cartridge, three chambers are included. The print cartridge container may also include a filter/standpipe assembly for each chamber. The standpipe defines a passageway through which ink flows as it travels from the chamber to the printhead. The filter is attached to the standpipe and functions to remove air bubbles and contaminants from the ink before the ink reaches the printhead. Contaminants, if not removed from the ink, may block orifices in the printhead orifice plate, thereby preventing ink from being ejected from those orifices.

The quality of printed images produced by an ink jet printer depends to a large degree on the resolution of the printer. Higher or finer resolution wherein the dots are more closely spaced provides for higher quality images.

A consideration with increasing the resolution of ink jet printers is that increased resolution results in more printed dots per unit area. For example, doubling print resolution from 600×600 dpi to 1200×1200 dpi results in four times as many dots per unit area. Since the number of dots per unit area increases with increased resolution, the size of each printed dot must decrease in order to avoid saturating the print media. Hence, the size of the orifices in the orifice plate must decrease. In order to prevent the smaller orifices from becoming blocked or obstructed by contaminants contained in ink, finer filters are required.

Conventional filters are typically made from a metal mesh. It is believed that very fine metal mesh filters would be costly to produce. Further, it is believed that ink pressure drop across the metal mesh filter would be large due to the meandering flow path the ink must take as it passes through the metal mesh.

Accordingly, there is a need for an improved filter which is capable of removing particles of varying sizes including very small particles from ink without also effecting a large drop in fluid pressure across the filter.

SUMMARY OF THE INVENTION

With the present invention, an improved filter is provided which is capable of removing particles of varying sizes including very small particles from a fluid without effecting a large drop in fluid pressure across the filter. The filter is adapted for use in an ink jet print cartridge for filtering contaminants from ink prior to the ink flowing to a printhead. It is also contemplated that the filter may be used in other applications where filters capable of removing particles of varying sizes including very small particles are desired.

The filter of the present invention is formed from a silicon substrate. The substrate has first and second etch resistant material layers on its opposing sides. One of the layers includes a plurality of pores, each preferably having an area or size of between about 0.5 $\mu m^2$ and about 25 $\mu m^2$. The second layer defines a filter layer which filters air bubbles and contaminants from ink passing through the filter. In contrast to conventional metal mesh filters, the silicon filter of the present invention has a direct flow path. Hence, the resistance to ink flow through the silicon filter is reduced. As resistance to ink flow decreases, pressure drop across the filter also decreases.

In one embodiment of the present invention, the second layer includes two or more filter sections, each comprising a plurality of pores. The second layer further includes at least one reinforcement rib positioned between the two filter sections.

In another aspect of the present invention, a print cartridge container/filter assembly is provided. The assembly comprises a print cartridge container having at least one chamber for receiving ink. The container further includes a standpipe which extends into the chamber and defines a passageway for ink to flow from the chamber to a printhead. The assembly further includes a filter, such as the one described above, which is associated with the container.

DETAILED DESCRIPTION OF PREFERRED EMBODIMENTS

Figure 1:
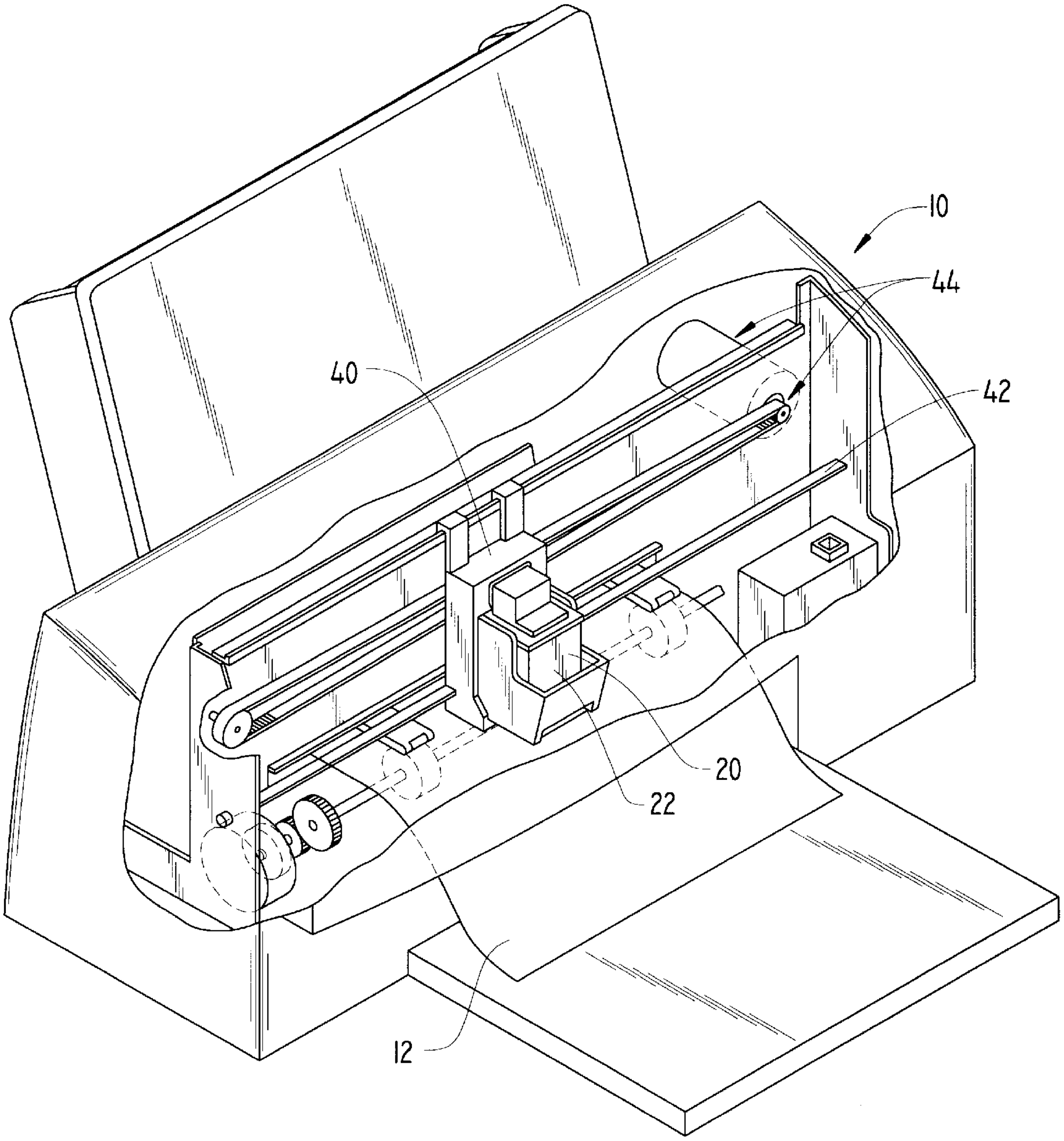
FIG. 1 is a perspective view, partially broken away, of an ink jet printing apparatus having a print cartridge constructed in accordance with the present invention.

Referring now to FIG. 1, there is shown an ink jet printing apparatus 10 having a print cartridge 20 constructed in accordance with the present invention. The cartridge 20 is supported in a carrier 40 which, in turn, is slidably supported on a guide rail 42. A drive mechanism 44 is provided for effecting reciprocating movement of the carrier 40 and the print cartridge 20 back and forth along the guide is rail 42. As the print cartridge 20 moves back and forth, it ejects ink droplets onto a paper substrate 12 provided below it.

Figure 2:
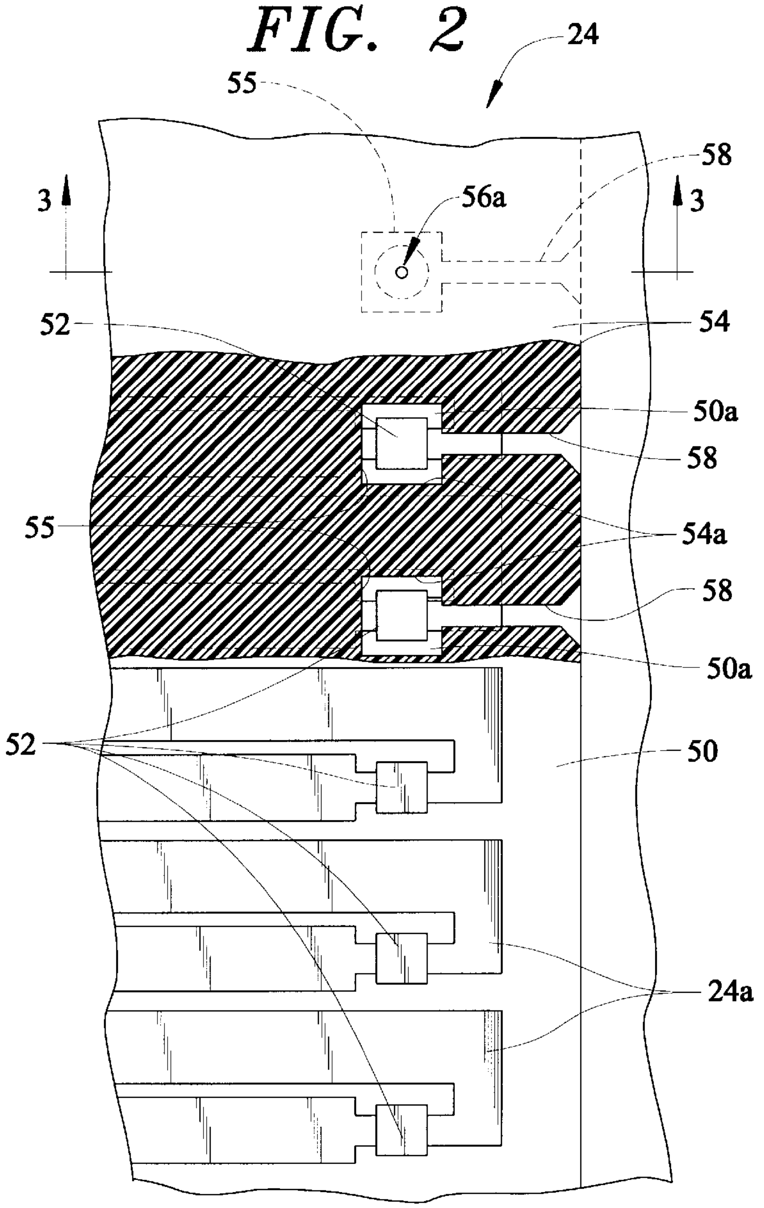
FIG. 2 is a view of a portion of a heater chip coupled to an orifice plate with sections of the orifice plate removed at two different levels.
Figure 3:
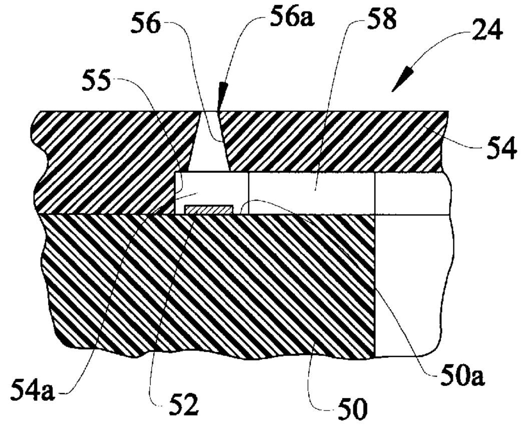
FIG. 3 is a view taken along section line 3—3 in FIG. 2.
Figure 4:
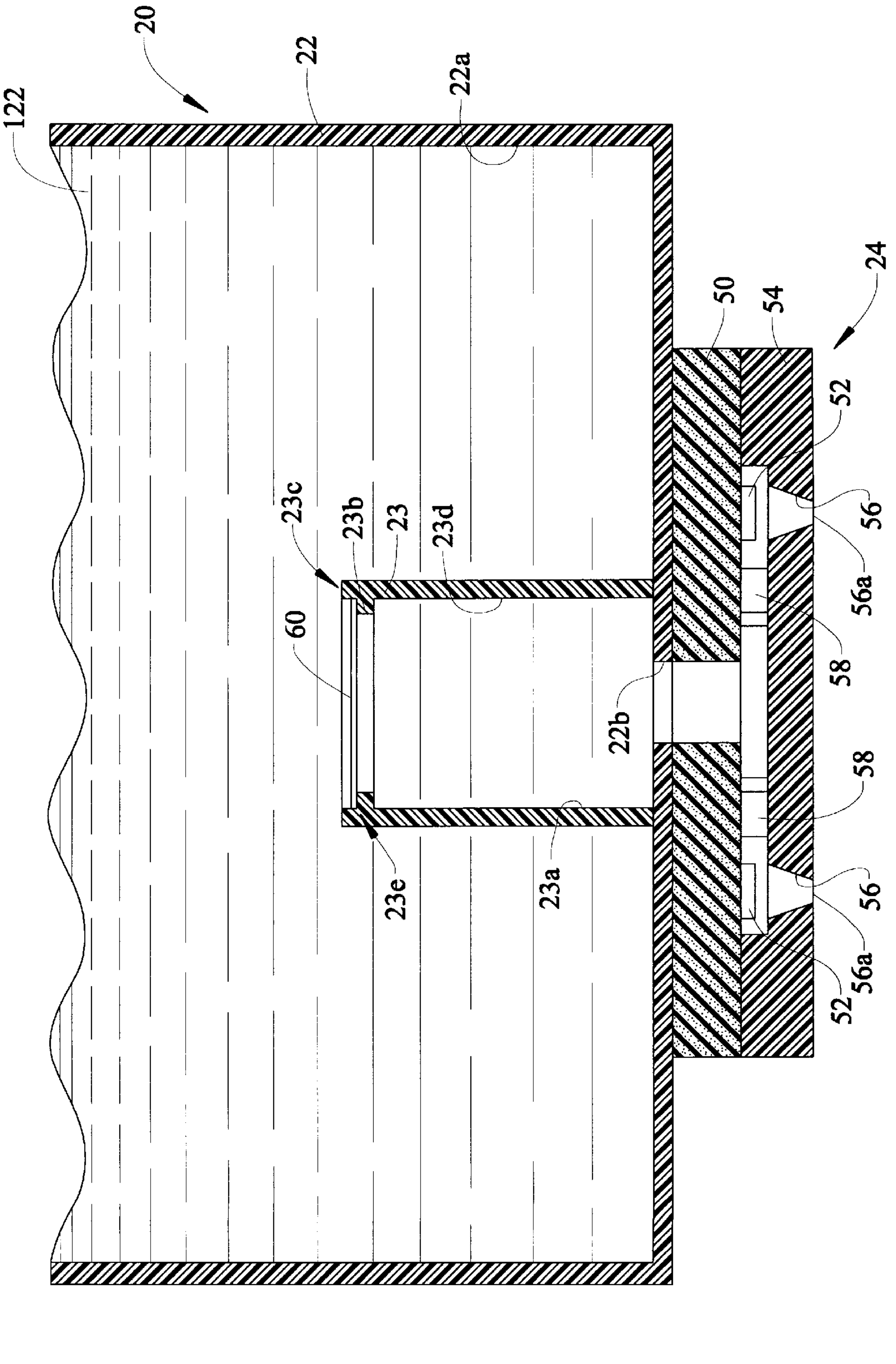
FIG. 4 is a schematic view in cross-section of a portion of a print cartridge formed in accordance with a first embodiment of the present invention.

The print cartridge 20 comprises a container 22, see FIGS. 1 and 4, and a printhead 24, see FIGS. 2–4, which is adhesively bonded or otherwise secured to the container 22. The container 22 includes an internal chamber 22*a* filled with ink 122, see FIG. 4. It further includes an outlet 22*b*. A standpipe 23, which forms part of the container 22, extends into the chamber 22*a* and defines a passageway 23*a* along which the ink 122 flows as it travels from the chamber 22*a* to the container outlet 22*b*. From the outlet 22*b*, the ink 122 flows to the printhead 24. A block of foam material (not shown) may be provided in the chamber 22*a*. The container 22 in the illustrated embodiment includes only one chamber 22*a*. However, it is contemplated that the container 22 may include more than one chamber, e.g., three chambers. Such a container is disclosed in U.S. Pat. No. 5,576,750, the disclosure of which is incorporated herein by reference.

The container 22 may be formed from a polymeric material. In the illustrated embodiment, the container 22 is formed from polyphenylene oxide, which is commercially available from the General Electric Company under the trademark "NORYL SE-1." Other materials not explicitly set out herein may also be used.

The printhead 24 comprises a heater chip 50 having a plurality of resistive heating elements 52, see FIGS. 2–4. The printhead 24 further includes a plate 54 having a plurality of openings 56 extending through it which define a plurality of orifices 56*a* through which droplets are ejected. The orifices 56*a* typically have a size (i.e., a diameter) of from about 5 $\mu$m to about 50 $\mu$m. The plate 54 may be bonded to the chip 50 via any art recognized technique, including a thermocompression bonding process. When the plate 54 and the heater chip 50 are joined together, sections 54*a* of the plate 54 and portions 50*a* of the heater chip 50 define a plurality of bubble chambers 55. Ink supplied by the container 22 flows into the bubble chambers 55 through ink supply channels 58. The resistive heating elements 52 are positioned on the heater chip 50 such that each bubble chamber 55 has only one heating element 52. Each bubble chamber 55 communicates with one orifice 56*a*, see FIG. 3.

The resistive heating elements 52 are individually addressed by voltage pulses provided by a printer energy supply circuit (not shown). Each voltage pulse is applied to one of the heating elements 52 to momentarily vaporize the ink in contact with that heating element 52 to form a bubble within the bubble chamber 55 in which the heating element 52 is located. The function of the bubble is to displace ink within the bubble chamber 55 such that a droplet of ink is expelled from an orifice 56*a* associated with the bubble chamber 55.

Figure 6:
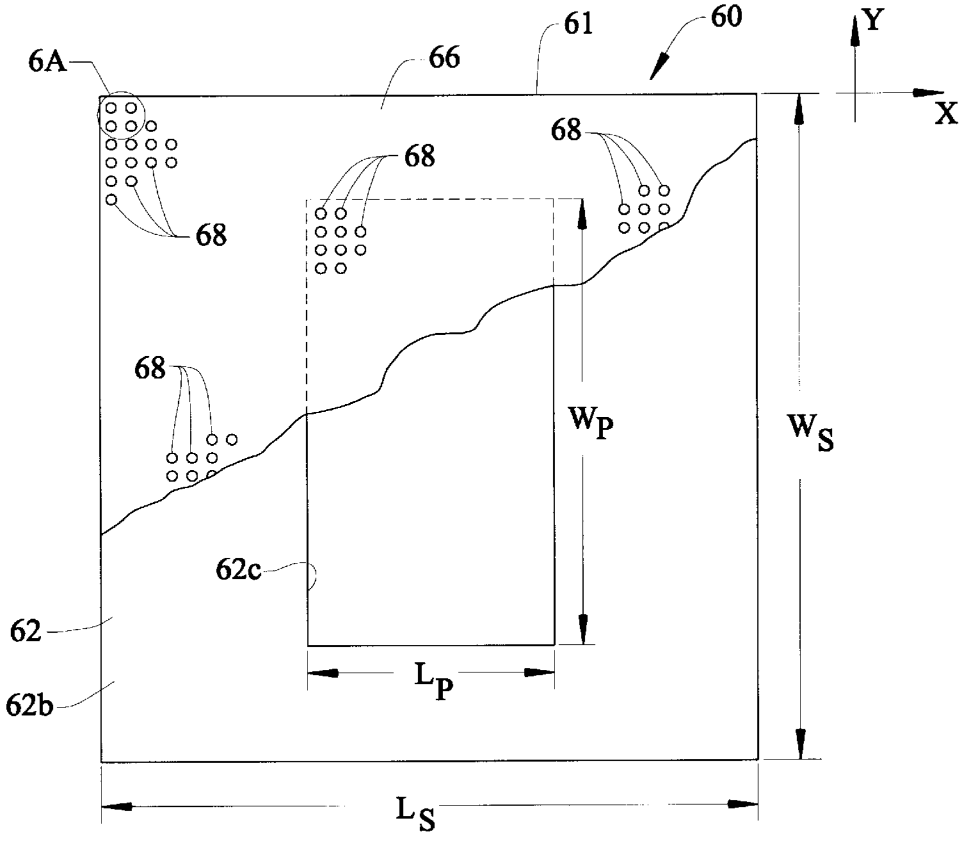
FIG. 6 is a plan view, partially broken away, of the filter illustrated in FIG. 5.

In accordance with the present invention, a silicon filter 60 is associated with the standpipe 23 of the container 22. In the illustrated embodiment, the standpipe 23 is formed having a ledge 23*b* at its entrance portion 23*c*, see FIG. 4. The ledge 23*b* together with an inner wall 23*d* of the standpipe 23 define a filter-receiving recess 23*e*. A commercially available adhesive, such as an epoxy, may be used to bond the filter 60 to the ledge 23*b* and the inner wall 23*d*. In the illustrated embodiment, the inner wall 23*d* of the standpipe 23 and the outer peripheral edge 61 of the filter 60 are generally rectangular in shape, see FIG. 6. They may also be square, circular, triangular or have any other geometric shape.

Figure 5:
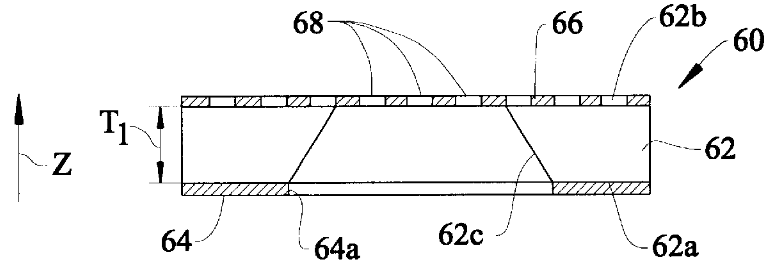
FIG. 5 is a schematic cross sectional view of a filter formed in accordance with a first embodiment of the present invention.

The filter 60 comprises a silicon substrate 62 having opposing first and second outer surfaces 62*a* and 62*b*, respectively, and a passage 62*c* extending completely through it, see FIG. 5. The substrate 62 has a length $L_S$ of from about 40 $\mu$m to about 50800 $\mu$m, and preferably about 6 mm; a width $W_S$ of from about 40 $\mu$m to about 50800 $\mu$m, and preferably about 6 mm; and, a thickness $T_S$ of from about 25 $\mu$m to about 2 mm, and preferably about 400 $\mu$m, see FIGS. 5 and 6. The passage 62*c* is rectangular in shape where it meets the second outer surface 62*b*, see FIG. 6. It may also be square, oval, elliptical, or have any other geometric shape. At the second outer surface 62*b*, the passage 62*c* has a length $L_P$ of from about 5 $\mu$m to about 49000 $\mu$m, and preferably about 5.5 mm, and a width $W_P$ of from about 5 $\mu$m to about 49000 $\mu$m, and preferably about 5.5 mm.

A first etch resistant material layer 64 is formed on the first substrate surface 62*a*. The first layer 64 includes an opening 64*a* extending completely through it which communicates with the substrate passage 62*c*. The opening 64*a* has generally the same shape and size as the passage 62*c* where the passage 62*c* meets the first substrate surface 62*a*. The first layer 64 has a thickness in the Z-direction, see FIG. 5, of from about 1 $\mu$m to about 20 $\mu$m, including all ranges subsumed therein, and preferably from about 1 $\mu$m to about 2.5 $\mu$m.

Figure 6A:
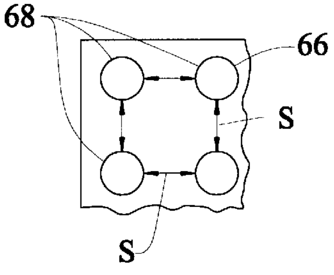
FIG. 6A is an enlarged view of a portion of the filter illustrated in FIG. 6.

A second etch resistant material layer 66 is formed on the second substrate surface 62*b*. The second layer 66 includes a plurality of pores 68 extending completely through it. At least a portion of the pores 68 communicate with the substrate passage 62*c*. The pores 68 have an area or size in an X-Y plane, see FIG. 6, of from about 0.5 $\mu m^2$ to about 25 $\mu m^2$, including all ranges subsumed therein; and preferably, from about 0.5 $\mu m^2$ to about 17 $\mu m^2$; more preferably, from about 1.0 $\mu m^2$ to about 8 $\mu m^2$; and most preferably, from about 1.0 $\mu m^2$ to about 5 $\mu m^2$. The spacing S between adjacent pores is from about 1 $\mu$m to about 50 $\mu$m, and preferably about 6 $\mu$m, see FIG. 6A. The second layer 66 has a thickness in the Z-direction, see FIG. 5, of from about 1 $\mu$m to about 20 $\mu$m, including all ranges subsumed therein, preferably, from about 1.0 $\mu$m to about 5.0 $\mu$m, and most preferably from about 1.0 $\mu$m to about 2.5 $\mu$m. The second layer 66 defines a filter layer which filters air bubbles and contaminants from the ink 122 as the ink 122 passes from the chamber 22*a* to the printhead 24.

The first and second layers 64 and 66 may be formed from any one of a number of known etch resistant materials including, for example, silicon nitride, silicon carbide, aluminum, tantalum, and silicon dioxide. It is believed that a stronger bond will result when the filter 60 is adhesively bonded to the standpipe 23 if the one etch resistant material layer 64 or 66 bonded to the standpipe 23 is formed from a metal. Other materials not explicitly set out herein may also be used when forming the layers 64 and 66.

Figure 8:
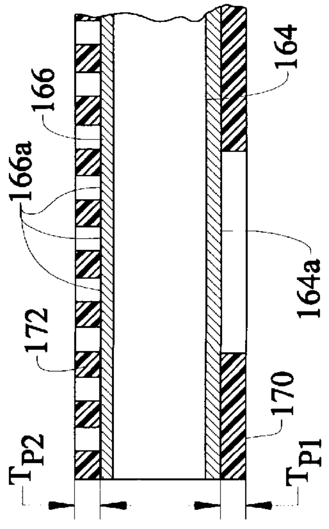
Figure 9:
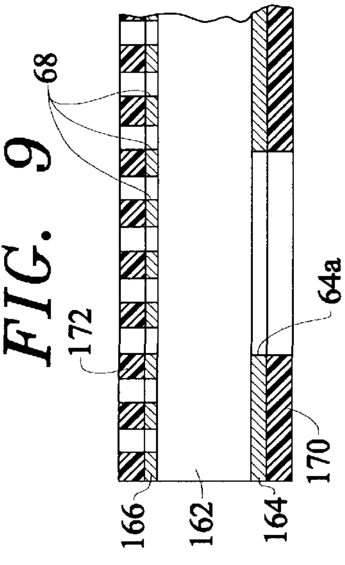

The process for forming the filter 60 will now be described with reference to FIGS. 7–9. A silicon wafer 162 having a thickness $T_S$ of from about 400 μm to about 650 μm is provided. The thickness of the wafer 162 is not critical and may fall outside of this range. A plurality of filters 60 are formed on a single wafer 162. However, for ease of illustration, only a portion of the wafer is illustrated in FIGS. 7–9.

Figure 7:
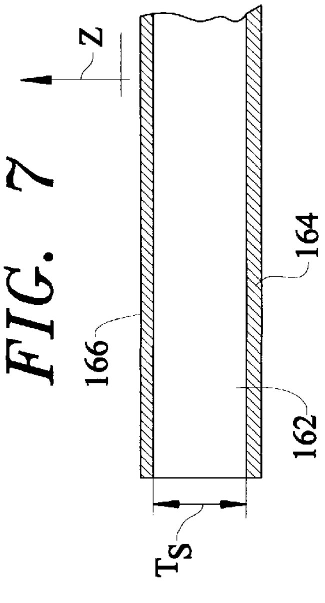
FIGS. 7–9 are schematic cross sectional views illustrating the process for forming the filter illustrated in FIG. 5.

First and second etch resistant material layers 164 and 166 are formed on opposite sides of the wafer 162, see FIG. 7. The layers 164 and 166 may be formed from any one of a number of known etch resistant materials including, for example, silicon nitride, silicon carbide, aluminum, tantalum, silicon dioxide, and the like. In the illustrated embodiment, silicon nitride is deposited simultaneously onto the outer surfaces of the wafer 162 using a conventional low-pressure vapor deposition process or a plasma enhanced chemical vapor deposition process. Alternatively, silicon dioxide layers may be thermally grown on the wafer 162, or aluminum or tantalum layers may be formed on the opposing wafer surfaces via a conventional sputter or evaporation process.

The first layer 164 has a thickness in the Z-direction, see FIG. 7, of from about 1 μm to about 20 μm, and preferably from about 1.0 μm to about 2.5 μm. The second layer 166 has a thickness in the Z-direction, see FIG. 7, of from about 1 μm to about 20 μm, and preferably from about 1.0 μm to about 2.5 μm.

After the first and second layers 164 and 166 are deposited onto the wafer 162, a first photoresist layer 170 is formed over the first etch resistant material layer 164 via a conventional spinning process. The layer 170 has a thickness $T_{P1}$ of from about 100 Å to about 50 μm, and preferably from about 1.0 μm to about 5.0 μm. The photoresist material may be a negative or a positive photoresist material. In the illustrated embodiment, the layer 170 is formed from a negative photoresist material which is commercially available from Olin Microelectronic Materials under the product designation "SC-100 Resist." After the first layer 170 is spun onto the wafer 162, it is softbaked at an appropriate temperature so as to partially evaporate photoresist solvents to promote adhesion of the layer 170 to the wafer 162. A further reason for softbaking the first layer 170 is to prevent a first mask, to be discussed below, from adhering to the first layer 170.

A first mask (not shown), having a plurality of blocked or covered areas which correspond to the first layer openings 64*a* in the filters 60, is positioned over the first photoresist layer 170. The first mask is aligned in a conventional manner such as to the wafer flat (not shown). Thereafter, unblocked portions of the first photoresist layer 170 are exposed to ultraviolet light to effect curing or polymerization of the exposed portions. The first mask is then removed. Thereafter, the unexposed or uncured portions of the first photoresist layer 170 are removed using a conventional developer chemical. In the illustrated embodiment, the unpolymerized portions are removed by spraying a developer, such as one which is commercially available from Olin Microelectronic Materials under the product designation "PF developer," onto the first wafer side while the wafer 162 is spinning. After the development process has been initiated, a mixture of about 90% developer chemical and 10% isopropyl alcohol, by volume, is sprayed onto the first side of the spinning wafer 162. Finally, the development process is stopped by spraying only isopropyl alcohol onto the spinning wafer 162. After the unpolymerized portions of the first photoresist layer 170 are removed from the wafer 162, portions 164*a* (only one portion is illustrated in FIG. 8) of the first etch resistant material layer 164 are exposed. Instead of spraying the three different development compositions onto the wafer 162, the wafer 162 may be sequentially placed in three baths containing, respectively, 100% developer, a mixture of about 90% developer and 10% isopropyl alcohol, and 100% isopropyl alcohol. The wafer 162 remains in the first bath until the development process has been initiated. It is removed from the second bath and placed in the third bath after the unpolymerized portions of the first layer 170 have been removed. The wafer 162 is preferably agitated when in each of the baths.

A second photoresist layer 172 is formed over the second etch resistant material layer 166 via a conventional spinning process. The layer 172 has a thickness $T_{P2}$ of from about 100 Å to about 50 μm, and preferably from about 1.0 μm to about 5.0 μm. The photoresist material from which the layer 172 is formed may be a negative or a positive photoresist material. In the illustrated embodiment, the layer 172 is formed from the same material as the first layer 170. After the second layer 172 is spun onto the wafer 162, it is softbaked at an appropriate temperature so as to partially evaporate photoresist solvents to promote adhesion of the layer 172 to the wafer 162.

A second mask (not shown), having a plurality of blocked or covered areas which correspond to the second layer pores 68 in the filters 60, is positioned over the second photoresist layer 172. The entire second mask may be provided with blocked areas so that each filter 60 will have a second layer 66 provided with pores 68 that extend over substantially the entire extent of the layer 66. Alternatively, blocked areas in the second mask may be formed only in portions of the mask that are generally coextensive with or slightly larger than portions having the blocked areas in the first mask. As such, each filter 60 will be formed having pores 68 only in the portion of the second layer 66 that extends over the substrate passage 62*c*.

The second mask is aligned in a conventional manner such as to the wafer flat (not shown). It is also contemplated that the mask may include one or more alignment markers which are aligned with one or more alignment marks provided on the wafer 162. After alignment, unblocked portions of the second photoresist layer 172 are exposed to ultraviolet light so as to effect curing or polymerization of the exposed portions. The second mask is then removed. The unpolymerized portions of the second photoresist layer 172 are removed in the same manner as the unpolymerized portions of the first photoresist layer 170. As can be seen in FIG. 8, after the unpolymerized portions of the second photoresist layer 172 are removed from the wafer 162, portions 166*a* of the second etch resistant material layer 166 are exposed.

Following the development of the second photoresist layer 172, the first and second layers 170 and 172 are hardbaked in a conventional manner so as to effect final evaporation of solvents in those layers 170 and 172.

The patterns formed in the first and second photoresist layers 170 and 172 are transferred to the first and second etch resistant material layers 164 and 166, see FIG. 9, using a conventional etching process. For example, a conventional reactive ion etching process may be used. When the first and second etch resistant material layers 164 and 166 are formed from silicon nitride, the reactive gas supplied to the reactive ion etcher is $CF_4$. For the etching of aluminum, a chlorine gas may be supplied. When the layers 164 and 166 are formed from tantalum, a $CF_4$ gas is preferably provided.

After the patterns have been transferred to the first and second etch resistant material layers 164 and 166, the polymerized photoresist material remaining on the wafer 162 is removed in a conventional manner. For example, a conventional reactive ion etcher receiving an $O_2$ plasma may be used. Alternatively, a commercially available resist stripper such as one which is available from Olin Microelectronic Materials under the product designation "Microstrip" may be used.

Finally, a micromachining step is implemented to form the substrate passages 62*c* in the silicon wafer 162. This step involves placing the wafer 162 in an etchant bath such that exposed portions of the silicon are etched away. A tetramethyl ammonium hydroxide (TMAH) based bath may be used. The TMAH based bath comprises, by weight, from about 5% to about 40%, and preferably about 10% tetramethyl ammonium hydroxide, and from about 60% to about 95%, and preferably about 90%, water. The TMAH/water solution is passivated by dissolving silicon and/or silicic acid into the TMAH/water solution until the solution has a pH of from about 11 to about 13. A more detail discussion of passivating TMAH solutions can be found in the paper: U. Schnakenberg, W. Benecke, and P. Lange,"THAHW Etchants for Silicon Micromachining," In Proc. Int. Conf. on Solid State Sensors and Actuators (Transducers 1991), pages 815–818, San Francisco, June 1991, the disclosure of which is incorporated herein by reference. The passivated TMAH/water solution is advantageous as it will not attack metal etch resistant layers 164 and 166. If the first and second etch resistant material layers 164 and 166 are formed from a non-metal, such as silicon nitride, a potassium hydroxide (KOH) based bath may be used. The KOH bath comprises, by weight, from about 5% to about 75%, and preferably about 45% potassium hydroxide, and from about 25% to about 95%, and preferably about 55% water. Thus, if the first and second etch resistant material layers 164 and 166 are formed from a metal, such as aluminum or tantalum, a tetramethyl ammonium hydroxide (TMAH) based bath should be used as a KOH bath will attack the metal layers 164 and 166. When sufficient etching has occurred such that the silicon substrate passage 62*c* for each filter 60 is formed, see FIG. 5, the wafer 162 is removed from the bath.

Thereafter, the wafer 162 is diced into individual filters 60.

The sequence of the above steps may vary. For example, the first pattern as defined by the developed first photoresist layer 170 may be transferred to the first etch resistant material layer 164 using a conventional etching process and the first photoresist layer 170 removed before the second photoresist layer 172 is formed on the second etch resistant material layer 166. It is also contemplated that the second photoresist layer 172 may be formed over the second etch resistant material layer 166, softbaked, exposed to ultraviolet light and developed before the first photoresist layer 170 is formed over the first etch material layer 164.

Figure 10:
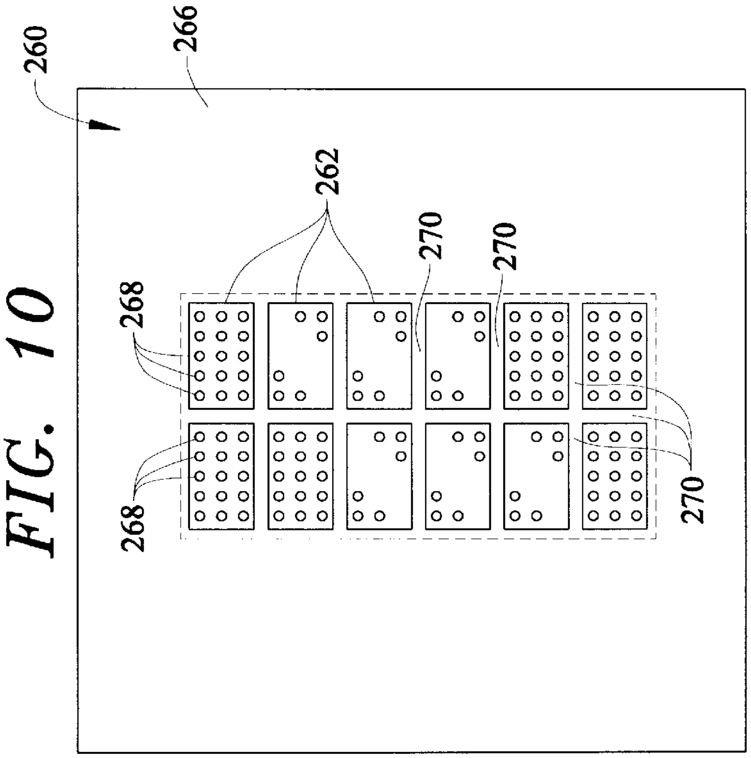
FIG. 10 is a plan view of a filter formed in accordance with a second embodiment of the present invention.

A filter 260, formed in accordance with a second embodiment of the present invention, is shown in FIG. 10. In this embodiment, the second etch resistant material layer 266 includes a plurality of filter sections 262 separate by reinforcement ribs 270. Each filter section 262 includes a plurality of pores 268. In the illustrated embodiment, the portions of the second layer 266 beyond the filter sections 262 do not 25 have pores 268. By providing one or more reinforcement ribs 270 in the second layer 266, the thickness of the second layer 266 may be reduced, thereby reducing fluid pressure drop across the second layer 266. Preferably, the thickness of the second layer 266 is about 1.0 $\mu$m. At this thickness, it is believed that the pressure drop across the filter 260 is negligible.

Figure 11:
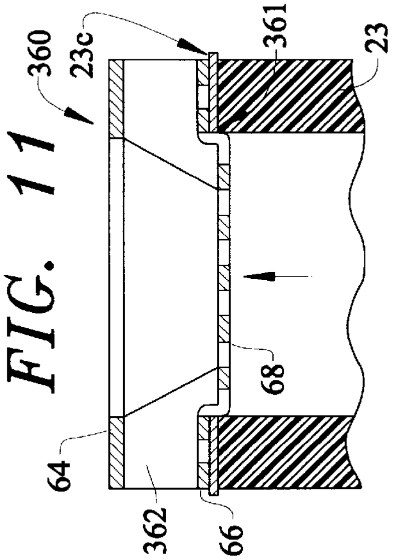
FIG. 11 is a cross sectional view of a filter formed in accordance with a third embodiment of the present invention.

A filter 360, formed in accordance with a third embodiment of the present invention, is shown in FIG. 11, where like reference numerals indicate like elements. In this embodiment, the filter 360 includes an outer circumferential recess 361 which is adapted to be fitted over and adhesively secured to the entrance portion 23*c* of a container standpipe 23. The recess 361 may be formed in the following manner. Before the first and second etch resistant material layers 164 and 166 are deposited on the wafer 162, a conventional photoresist layer, e.g., the SC-100 resist material described above, is formed on the second side of the wafer such that an outer peripheral portion of each filter silicon substrate 362 is exposed. A conventional etching process is then performed, such as a reactive ion etching process, so as to remove to a predefined depth a portion of silicon along the outer periphery of each silicon substrate 362. Thereafter, first and second etch material layers 164 and 166 are formed on the wafer 162 and the process for forming the remaining portions of the filters are performed as discussed above with regard to FIGS. 7–9.

It is also contemplated that the heater chip 50 may comprise an edge-fed heater chip rather than a center-fed heater chip.

What is claimed:

1. A print cartridge container/filter assembly comprising:

a container including at least one chamber for receiving ink, said container including a standpipe extending into said chamber and defining a passageway for ink to flow out from said chamber; and a filter associated with said standpipe for filtering contaminants from the ink prior to the ink flowing out from said standpipe, said filter comprising a silicon substrate having opposing first and second surfaces and a passage extending therethrough, a first etch resistant material layer formed on said first substrate surface and including at least one opening which extends through said first layer and communicates with said substrate passage, and a second etch resistant material layer formed on said second substrate surface and including a plurality of pores extending through said second layer and communicating with said substrate passage, said second layer defining a filter layer which filters contaminants from ink passing through said second layer, wherein said filter includes an outer circumferential recess which is adapted to mate with an end portion of said standpipe.

2. A print cartridge container/filter assembly as set forth in claim 1, wherein said pores have a size of between about 0.5 $\mu m^2$ and about 25 $\mu m^2$.

3. A print cartridge container/filter assembly as set forth in claim 2, wherein said pore size is from about 1 $\mu m^2$ to about 8 $\mu m^2$.

4. A print cartridge container/filter assembly as set forth in claim 3, wherein said second layer has a thickness of from about 1 $\mu$m to about 2.5 $\mu$m.

5. A print cartridge container/filter assembly as set forth in claim 2, wherein said pore size is from about 1 $\mu m^2$ to about 5 $\mu m^2$.

6. A print cartridge container/filter assembly as set forth in claim 5, wherein said second layer has a thickness of from about 1 $\mu$m to about 2.5 $\mu$m.

7. A print cartridge container/filter assembly as set forth in claim 2, wherein said second layer has a thickness of from about 1 $\mu$m to about 20 $\mu$m.

8. A print cartridge container/filter assembly as set forth in claim 1, wherein said standpipe comprises a hollow column having an inner ledge which is adapted to receive said filter.

9. A print cartridge container/filter assembly as set forth in claim 8, wherein said column is generally rectangular in shape.

10. A print cartridge container/filter assembly as set forth in claim 1, wherein at least one of said first and second layers is formed from a material selected from the group consisting of silicon nitride, silicon carbide, aluminum, tantalum, and silicon dioxide.

11. A print cartridge container/filter assembly as set forth in claim 1, wherein at least one of said first and second layers is formed from a metal.

12. A print cartridge container/filter assembly as set forth in claim 1, wherein only a portion of said second etch resistant material layer includes pores.

* * * * *